US005823408A

United States Patent [19]
Kim

[11] Patent Number: 5,823,408
[45] Date of Patent: Oct. 20, 1998

[54] DEVICE FOR MOUNTING/DEMOUNTING SPARE TIRE FOR AUTOMOBILE

[75] Inventor: Jeong-Gi Kim, Ansan, Rep. of Korea

[73] Assignee: Hyundai Motor Company, Seoul, Rep. of Korea

[21] Appl. No.: 967,882

[22] Filed: Nov. 12, 1997

[30] Foreign Application Priority Data

Nov. 14, 1996 [KR] Rep. of Korea ............... 1996-53935

[51] Int. Cl.⁶ ............... B62D 43/10; B62D 43/06
[52] U.S. Cl. ............... 224/42.21; 224/42.24; 224/42.32; 414/463
[58] Field of Search ............... 224/42.21, 42.24, 224/42.32; 414/463, 465, 466, 426; 296/37.2

[56] References Cited

U.S. PATENT DOCUMENTS

| | | | |
|---|---|---|---|
| 4,111,344 | 9/1978 | MacDonald | 224/42.24 |
| 4,153,188 | 5/1979 | Seymour | 224/42.24 |
| 4,738,382 | 4/1988 | Natori | 224/42.24 |

*Primary Examiner*—Linda J. Sholl
*Attorney, Agent, or Firm*—Christie, Parker & Hale, LLP

[57] ABSTRACT

A device for mounting/demounting a spare tire for automobiles, comprises: a pivot support bracket which is installed in recesses formed on the bottom of a trunk, and includes a turn support hole formed in its center; a pivot rod including a pivot rotatively inserted into the turn support hole, and a screw formed on its outer circumference; a moving rod including a screw on its inner circumference, which matches with the screw of the pivot rod, to move upward and downward, and a screw on its outer circumference having the same turn direction as the screw on inner circumference; and a handle installed on the moving rod to rotate it.

2 Claims, 2 Drawing Sheets

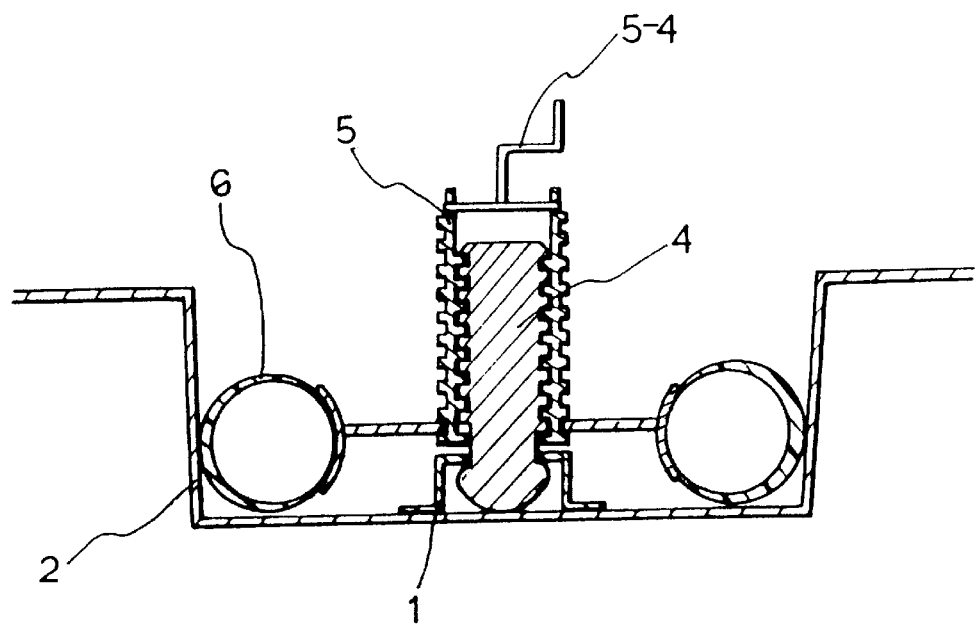
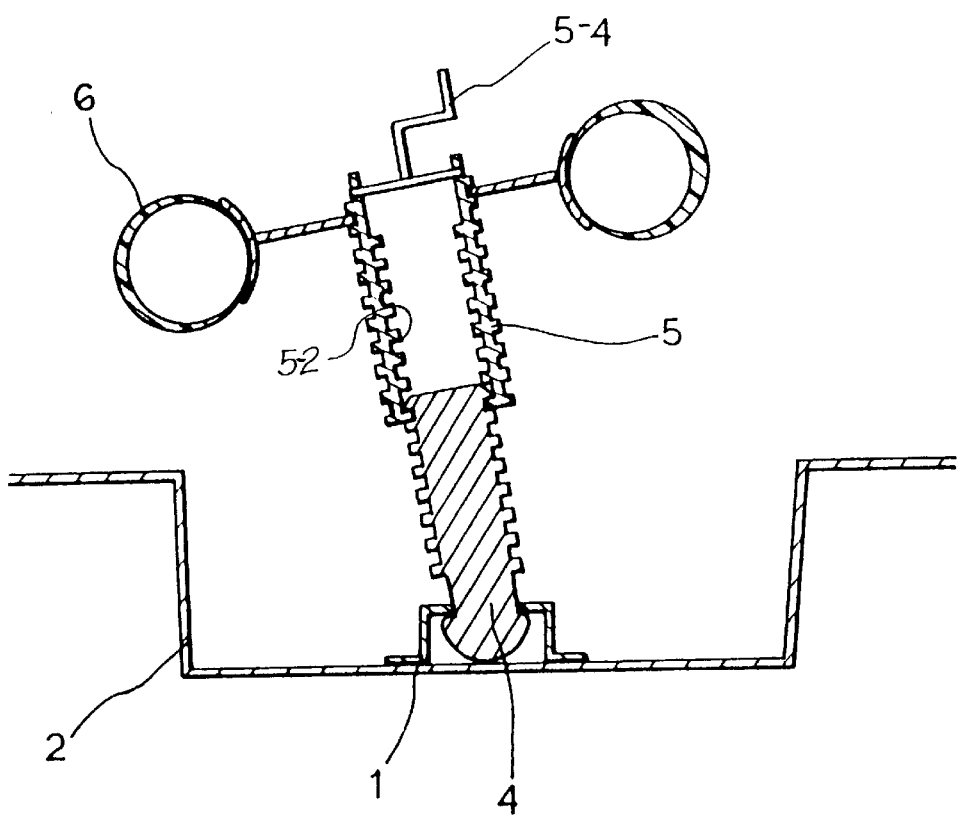

DEVICE FOR MOUNTING/DEMOUNTING SPARE TIRE FOR AUTOMOBILE

BACKGROUND OF THE INVENTION

1. Field of the Invention

The present invention relates to a device for mounting an automobile spare tire in a trunk for its preservation, or removing it from the trunk.

2. Discussion of Related Art

Generally, the automobile is loading the spare tire, in order to prepare against an unexpected flat tire or damaged tire. The spare tire is fixed in a trunk such that it can be mounted/taken in/out of the trunk.

There are recesses on the bottom of the trunk, where the spare tire is fixed with fixing bolts. The trunk bottom under which the spare tire is located, is covered, before a variety of articles are laid thereon.

In the conventional spare tire fixation construction, however, the fixing bolts are to be tightened up or loosened to fix the spare tire in the trunk bottom or to take out of the trunk. Accordingly, it is troublesome and difficult to mount and remove the spare tire.

SUMMARY OF THE INVENTION

Accordingly, the present invention is directed to a device for mounting/demounting a spare tire for automobiles that substantially obviates one or more of the problems due to limitations and disadvantages of the related art.

An object of the present invention is to provide a device for mounting/demounting a spare tire for automobiles, in which a spare tire descends to be received in recesses on the bottom of a trunk, or ascends to be taken out of the trunk, in accordance with the turning operation of a handle.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device comprises: a pivot support bracket which is installed in recesses formed on the bottom of a trunk, and includes a turn support hole formed in its center; a pivot rod including a pivot rotatively inserted into the turn support hole, and a screw formed on its outer circumference; a moving rod including a screw on its inner circumference, which matches with the screw of the pivot rod, to move upward and downward, and a screw on its outer circumference having the same turn direction as the screw on inner circumference; and a handle installed on the moving rod to rotate it.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2 illustrates an assembling state in which the spare tire is taken down; and FIG. 3 illustrates an assembling state in which the spare tire is raised.

DETAILED DESCRIPTION OF PREFERRED EMBODIMENT

Figure 1:
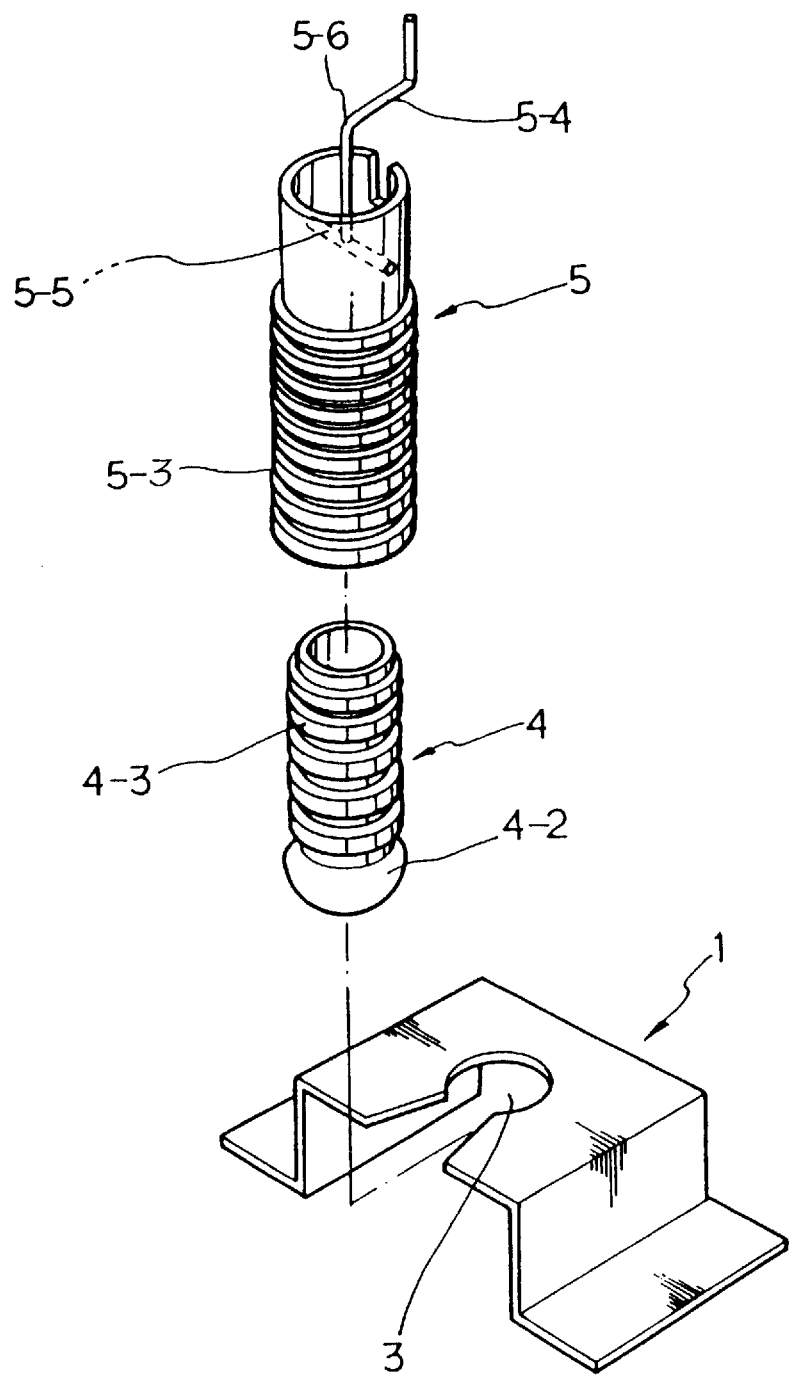
FIG. 1 is an exploded perspective view of a device for mounting/demounting a spare tire for automobiles according to the present invention.

Reference will now be made in detail to the preferred embodiments of the present invention, examples of which are illustrated in the accompanying drawings.

Referring to FIG. 1, a pivot support bracket 1 is fixed on trunk bottom panel 2 where recesses are formed to receive the spare tire. The pivot support bracket 1 is installed in the center of the recesses.

In the center of the pivot support bracket 1 is formed a turn support hole 3 in communication with an opening extending to one side of the pivot support bracket 1. Through the opening a pivot rod 4 is easily installed in the turn support hole 3.

The pivot rod 4 is shaped as a pipe with a hemispheric pivot 4-2 at its lower portion and integrally formed with it. The pivot 4-2 is inserted into the turn support hole 3 through the opening of the pivot support bracket 1. A screw 4-3 is longitudinally formed on the outer circumference of the pivot rod 4.

A moving rod 5 is mounted to engage with the pivot rod 4 such that it moves up and down along the pivot rod. That is, the moving rod 5 is shaped as a pipe with a screw 5-2 which is longitudinally formed on its inner circumference and engages with the screw 4-3 of the pivot rod 4. When the moving rod 5 is made to rotate clockwise or counterclockwise, accordingly, the screw 5-2 of the moving rod 5 is in interaction with the screw 4-3 of the pivot rod 4 so that the moving rod 5 rotates, ascending or descending along the pivot rod.

A screw 5-3 is formed on the outer circumference of the moving rod 5, and has the same turn direction as the screw 4-3. A wheel of a spare tire is fitted in the screw 5-3.

A handle 5-4 is mounted on top of the moving rod 5, for easily rotating the moving rod. The handle 5-4 includes a rotatable horizontal portion 5—5, and a vertical portion 5-6 perpendicular to the horizontal portion 5—5. In the upper portion of the moving rod 5 is formed an insertion slit 5-7, where the horizontal portion 5—5 is rotated to allow the vertical portion 5—5 to be inserted.

The following description relates to the operation of the present invention according to the aforesaid embodiments, referring to FIGS. 2 and 3.

In case that the spare tire 6 is mounted in the trunk for its preservation, a user rotates the handle 5-4 clockwise so that the moving rod 5 integrally formed with the handle is clockwise rotated. When the moving rod 5 rotates clockwise, the screw of the moving rod and the screw of the pivot rod are in interaction with each other so that the moving rod rotates, ascending along the pivot rod, as mentioned above.

After the moving rod 5 fully ascends, the wheel of the spare tire is fitted between screw threads of the moving rod. In this state, the user counterclockwise rotates the handle 5-4, causing the moving rod 5 to rotate counterclockwise also. Therefore, the moving rod 5 rotates counterclockwise, descending along the pivot rod 4.

When the moving rod 5 rotates and descends, the spare tire 6 fitted between screw threads of the moving rod also descends. The spare tire goes on with its descending motion until it is located between the final screw threads of the moving rod. When the spare tire descends completely, it is mounted on the bottom of recesses in the trunk, fitted between the final screw threads of the moving rod, as shown in FIG. 2.

In case the user intends to take the spare tire 6 out of the trunk to use it, he rotates the handle 5-4 clockwise, causing the moving rod 5 to be rotated in the same direction. The moving rod 5 rotates, ascending along the pivot rod due to the operation of the screw. And the spare tire fitted between the screw threads of the moving rod ascends.

When the spare tire ascends fully, the user easily removes the spare tire from the moving rod. After the spare tire is removed, the user rotates the handle 5-4 counterclockwise again so that the moving rod 5 descends along the pivot rod, before mounted in recesses. When the horizontal portion 5—5 of the handle is rotated to allow the vertical portion 5—5 of the handle to be inserted into the insertion slit 5-7, the handle does not protrude from the trunk bottom, not to thereby be an obstacle in loading the articles on the trunk bottom.

As described above, when the user has only to rotate the handle, the spare tire ascends or descends along the moving rod. Accordingly, the spare tire is stably mounted in recesses of the trunk bottom, and easily removed from the trunk.

It will be apparent to those skilled in the art that various modifications and variations can be made in a device for mounting/demounting a spare tire for automobiles of the present invention without departing from the spirit or scope of the invention. Thus, it is intended that the present invention cover the modifications and variations of this invention provided they come within the scope of the appended claims and their equivalents.

What is claimed is:

1. A device for mounting/demounting a spare tire for automobiles, comprising:

a pivot support bracket which is installed in recesses formed on the bottom of a trunk, and includes a turn support hole formed in its center;

a pivot rod including a pivot rotatively inserted into the turn support hole, and a screw formed on its outer circumference;

a moving rod including a screw on its inner circumference, which matches with the screw of the pivot rod, to move upward and downward, and a screw on its outer circumference having the same turn direction as the screw on inner circumference; and a handle installed on the moving rod to rotate it.

2. The device as claimed in claim 1, wherein the handle comprises a rotatable horizontal portion, and a vertical portion integrally formed with the horizontal portion, and in the upper portion of the moving rod is formed an insertion slit, where the horizontal portion is rotated to allow the vertical portion to be inserted.

* * * * *